UNITED STATES PATENT OFFICE.

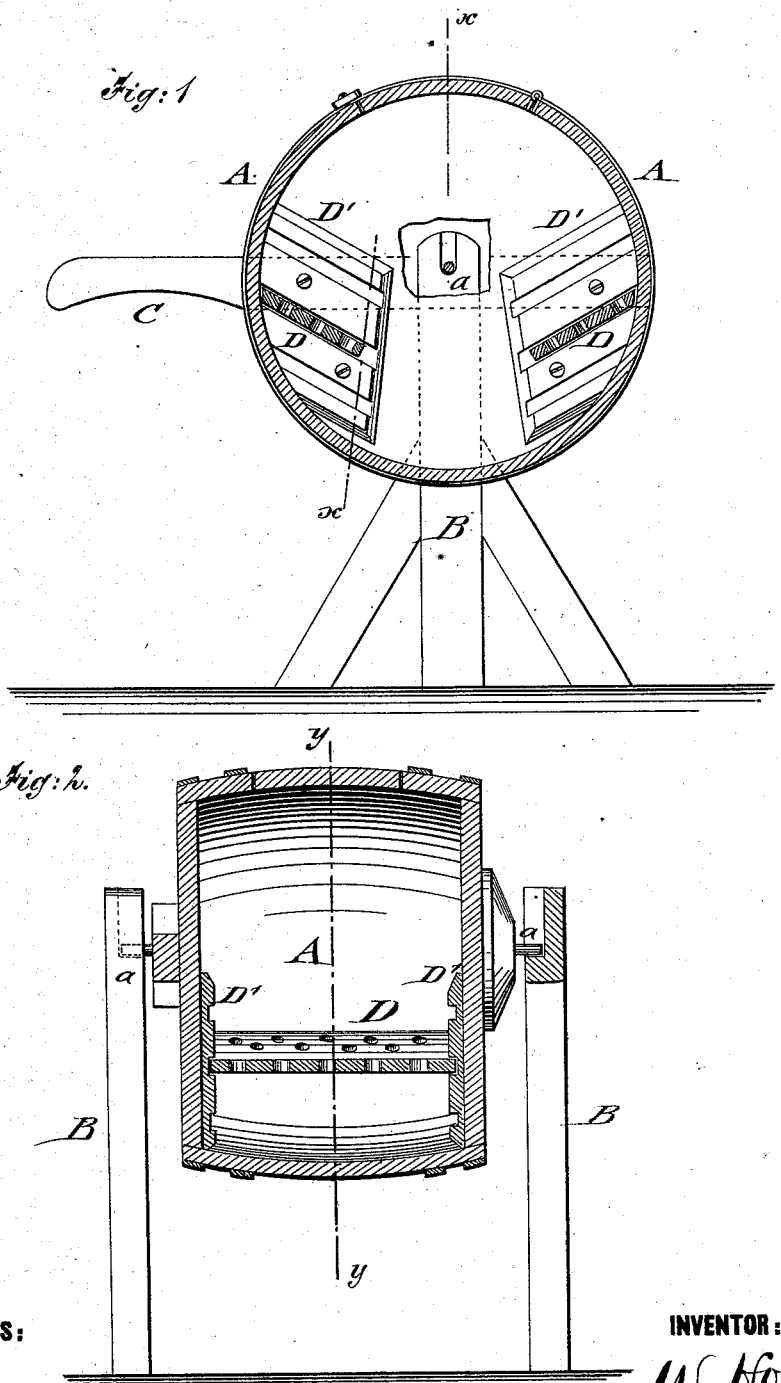

WILHELM HOWE, OF BROOKLYN, NEW YORK.

IMPROVEMENT IN RECIPROCATING CHURNS.

Specification forming part of Letters Patent No. 162,821, dated May 4, 1875; application filed April 3, 1875.

*To all whom it may concern:*

Be it known that I, WILHELM HOWE, of Brooklyn, in the county of Kings and State of New York, have invented a new and Improved Churn, of which the following is a specification:

In the accompanying drawing, Figure 1 represents a vertical longitudinal section on the line $yy$, Fig. 2; and Fig. 2, a vertical transverse section on the line $xx$, Fig. 1, of my improved churn.

Similar letters of reference indicate corresponding parts.

My invention relates to an improvement in that class of churns in which rotary reciprocating motion is imparted to the tub, supported on suitable standards or posts; and my invention consists of a swinging churn, provided on the inside with guide-plates having inclined grooves, for adjusting therein the detachable perforated dash-boards to the quantity of cream in the tub.

In the drawing, A represents a tub of cylindrical, oval, or other shape, which is supported by outer gudgeons $a$, on side standards or posts B. The gudgeons are preferably placed in a somewhat eccentrical position into the vertical axis of the tub, so that the greater weight of cream is below the gudgeons, and thereby the entire swinging around of the tub prevented. Swinging motion is imparted to the tub by a hand-lever, C, applied in suitable manner to the side of the same.

The cream is filled into the tub through a top aperture, with tightly-sealing lid or door, of such size that the inside of the tub may be readily cleaned and the dash-boards adjusted. Perforated dash-boards D are arranged symmetrically at opposite points at the inside of the tub, and secured in inclined position by guide-strips or grooved guide-plates D', applied to the sides of the tub. The dash-boards D are placed in a lower or higher position on the supporting-plates, according to the quantity of cream to be worked in the tub, which offers the great advantage of using the churn with any quantity of cream at its full working power. The greater the quantity of cream in the tub, the higher are the dash-boards to be adjusted. The swinging motion of the tub carries the cream with considerable force from one side to the other, and through the perforations of the dash-boards, exposing with each reciprocating motion of the tub a new quantity of cream to the breaking action of dash-boards, so as to accomplish the formation of butter within short time, and at an ease of manipulation that any child may soon be able to readily work the churn.

Having thus described my invention, I claim as new and desire to secure by Letters Patent—

A swinging churn provided with dash-board D, adjustable in supporting-plates D', as and for the purpose specified.

WILHELM HOWE.

Witnesses:
   T. B. MOSHER,
   ALEX. F. ROBERTS.